US011992850B2

(12) United States Patent
Zhadanov

(10) Patent No.: US 11,992,850 B2
(45) Date of Patent: May 28, 2024

(54) SHOWERHEAD HAVING SELECTOR FOR DIRECTING WATER FLOW IN INDEPENDENT DIRECTIONS

(71) Applicant: Eli Zhadanov, Linden, NJ (US)

(72) Inventor: Eli Zhadanov, Brooklyn, NY (US)

( * ) Notice: Subject to any disclaimer, the term of this patent is extended or adjusted under 35 U.S.C. 154(b) by 570 days.

(21) Appl. No.: 17/247,425

(22) Filed: Dec. 10, 2020

(65) Prior Publication Data

US 2022/0184643 A1 Jun. 16, 2022

(51) Int. Cl.

*B05B 1/16* (2006.01)
*B05B 1/04* (2006.01)
*B05B 1/10* (2006.01)
*B05B 1/18* (2006.01)

(52) U.S. Cl.

CPC ................ *B05B 1/169* (2013.01); *B05B 1/04* (2013.01); *B05B 1/10* (2013.01); *B05B 1/185* (2013.01)

(58) Field of Classification Search

CPC .. B05B 1/04; B05B 1/042; B05B 1/10; B05B 1/169; B05B 1/18; B05B 1/185; B05B 1/1636; B05B 1/16; B05B 1/326; B05B 1/02; B05B 12/002; B05B 1/3026; B05B 15/65; E03C 1/0405; E03C 1/0404; E03C 1/0408; E03C 2001/0414; A61C 17/032; A47K 3/28

USPC ................................................. 239/289, 436

See application file for complete search history.

(56) References Cited

U.S. PATENT DOCUMENTS

2009/0265848 A1 10/2009 Tsai
2011/0133003 A1* 6/2011 Lu .......................... B05B 1/169 239/587.5
2011/0147490 A1 6/2011 Chen
2013/0254985 A1 10/2013 Zhou et al.
2014/0034758 A1 2/2014 Buehler et al.
2015/0102130 A1* 4/2015 Davenport ................ B05B 1/16 239/289
2015/0343464 A1 12/2015 Luettgen et al.
2019/0085990 A1 3/2019 Kinle et al.
2020/0206753 A1* 7/2020 Wu ........................... B05B 1/02

FOREIGN PATENT DOCUMENTS

CN 203258107 10/2013
DE 102011051864 A1 * 1/2011 ............... B05B 1/18
DE 102011051864 1/2013
EP 3175922 6/2017
JP S5898152 6/1983

* cited by examiner

*Primary Examiner* — Qingzhang Zhou
*Assistant Examiner* — Juan C Barrera
(74) *Attorney, Agent, or Firm* — Fay Kaplun & Marcin, LLP

(57) ABSTRACT

Embodiments disclosed herein relate to a showerhead having a head portion; a handle extending from the head portion, the handle having an inlet disposed at an end of the handle opposite the head portion and a first channel extending through the handle; a faceplate disposed at a first side of the head portion; a plurality of nozzles extending through the faceplate; at least one first nozzle disposed in the head portion separate from the faceplate; a second nozzle adjacent to the at least one first nozzle; and a flow director having a second channel fluidly coupled to the first channel and moveable between a first position, a second position, and a third position to selectively direct a flow of water through a corresponding one of the plurality of nozzles, the at least one first nozzle, or the second nozzle.

15 Claims, 14 Drawing Sheets

SHOWERHEAD HAVING SELECTOR FOR DIRECTING WATER FLOW IN INDEPENDENT DIRECTIONS

BACKGROUND

Currently, there are various showerheads on the market that exhibit different properties. For example, different showerheads have different nozzles and nozzle patterns to achieve desired water pressures and/or water coverage areas. In addition, some showerheads have a pulsating water functionality.

When cleaning shower/bathing areas (e.g., tiled walls, tubs, etc.), people typically use the showerhead to clean, wash and/or rinse these areas with water. However, because typical showerhead nozzles and nozzle configurations are designed to be used primarily for showering, the resulting water pressure and/or pattern may be undesirable for cleaning purposes.

SUMMARY

Some exemplary embodiments include a showerhead having a head portion; a handle extending from the head portion, the handle having an inlet disposed at an end of the handle opposite the head portion and a first channel extending through the handle; a faceplate disposed at a first side of the head portion; a plurality of nozzles extending through the faceplate; at least one first nozzle disposed in the head portion separate from the faceplate; a second nozzle disposed adjacent to the at least one first nozzle; a first plenum disposed within the head portion and fluidly coupled to the plurality of nozzles; a second plenum disposed within the head portion and fluidly coupled to the at least one first nozzle; a third plenum disposed within the head portion and fluidly coupled to the second nozzle; and a flow director having a second channel fluidly coupled to the first channel and moveable between a first position in which the second channel fluidly couples the first channel to the first plenum, a second position in which the second channel fluidly couples the first channel to the second plenum, and a third position in which the second channel fluidly couples the first channel to the third plenum to selectively direct a flow of water through a corresponding one of the plurality of nozzles, the at least one first nozzle, or the second nozzle.

Other exemplary embodiments include a showerhead having a head portion; a handle extending from the head portion, a handle extending from the head portion, the handle having an inlet disposed at an end of the handle opposite the head portion and a first channel extending through the handle; a faceplate disposed at a first side of the head portion; a plurality of nozzles extending through the faceplate; a pair of first nozzles disposed on a second side of the head portion opposite the first side; a second nozzle disposed between the pair of first nozzles; a first plenum disposed within the head portion and fluidly coupled to the plurality of nozzles; a second plenum disposed within the head portion and fluidly coupled to the at least one first nozzle; a third plenum disposed within the head portion and fluidly coupled to the second nozzle; a flow director having a second channel fluidly coupled to the first channel and moveable between a first position in which the second channel fluidly couples the first channel to the first plenum, a second position in which the second channel fluidly couples the first channel to the second plenum, and a third position in which the second channel fluidly couples the first channel to the third plenum to selectively direct a flow of water through a corresponding one of the plurality of nozzles, the at least one first nozzle, or the second nozzle; and a flow selector coupled to the flow director and configured to allow a user to move the flow director to a desired one of the first position, the second position, and the third position, wherein each of the pair of first nozzles is configured to create a fan-shaped spray, and wherein the second nozzle is configured to create a jet stream of water.

Other exemplary embodiments include a showerhead having a head portion; a handle extending from the head portion; a plurality of nozzles configured to direct water flow in a first direction; at least one first nozzle disposed in the head portion and configured to direct water flow in a second direction; at least one second nozzle disposed adjacent to the at least one first nozzle and configured to direct water flow in the second direction; and a flow selector moveable between a first position in which water flow is directed through the plurality of nozzles and a second position in which water flow is directed through the at least one first nozzle and the at least one second nozzle; wherein the second direction is transverse to the first direction, and wherein the flow selector is configured to remain in one of the first position or second position without an external force continuously maintaining a desired position of the flow selector.

DETAILED DESCRIPTION

Figure 1A:
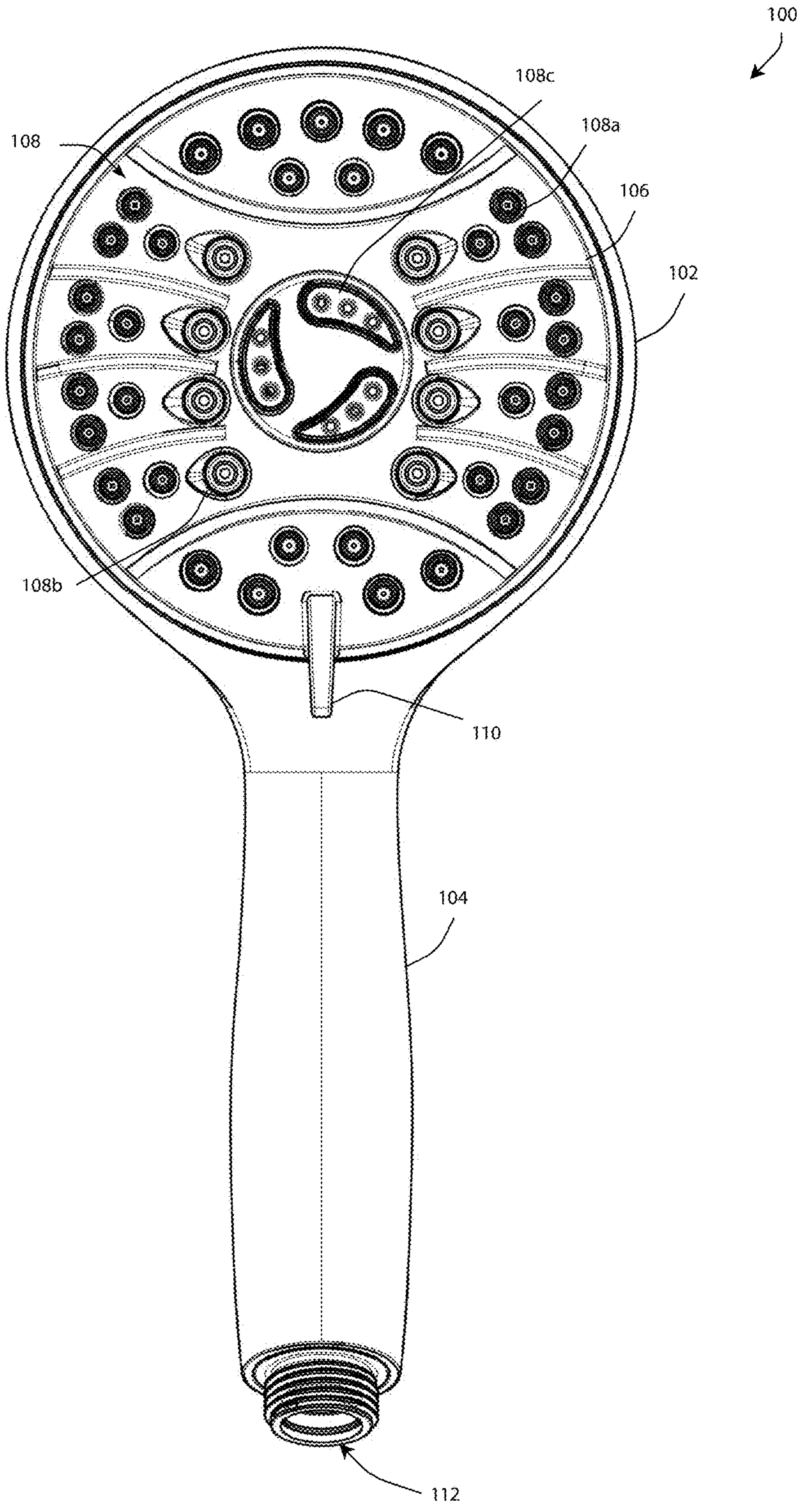
FIG. 1A shows a bottom view of an exemplary showerhead according to various exemplary embodiments.

The exemplary embodiments may be further understood with reference to the following description and the related appended drawings, wherein like elements are provided with the same reference numerals. The exemplary embodiments describe a showerhead configured to selectively direct water flow through one or more nozzles in a direction different than that of a plurality of nozzles disposed on a face of the showerhead.

As noted above, using conventional showerheads to clean a shower area may yield undesirable effects. For example, because a conventional showerhead has so many nozzles on its face, water flow through the showerhead is divided among the nozzles, thus resulting in a lower water pressure at each nozzle. As such, a complete rinsing of a cleaning agent on a wall or other shower area surface may not be achieved effectively. Although some showerheads allow the user to select a subset of nozzles on the showerhead face to achieve a different water pressure and/or water coverage area, the higher pressure achieved is still typically not great enough for cleaning purposes. This issue is due to the fact that the nozzles on the showerhead face are designed for showering purposes. A water pressure and/or coverage area sufficient for cleaning may not be suitable for showering purposes. In other instances, showering water flow pattern may be too narrow and may not cover a wide enough area for rinsing off soap suds from large surface areas, yet in other cases flow direction cannot be directed to desired cleaning area.

According to some exemplary embodiments, a showerhead is configured to selectively direct water flow through one or more nozzles independent of a plurality of nozzles on the showerhead face. The one or more nozzles may include a nozzle configured to create a jet stream of water. The one of more nozzles may also include a pair of nozzles, each of which is configured to create a fan-shaped spray. The showerhead is configured to allow the user to select between a normal functionality in which water is directed through the plurality of nozzles on the front face, the high pressure-stream, or the fan-shaped spray.

Figure 1B:
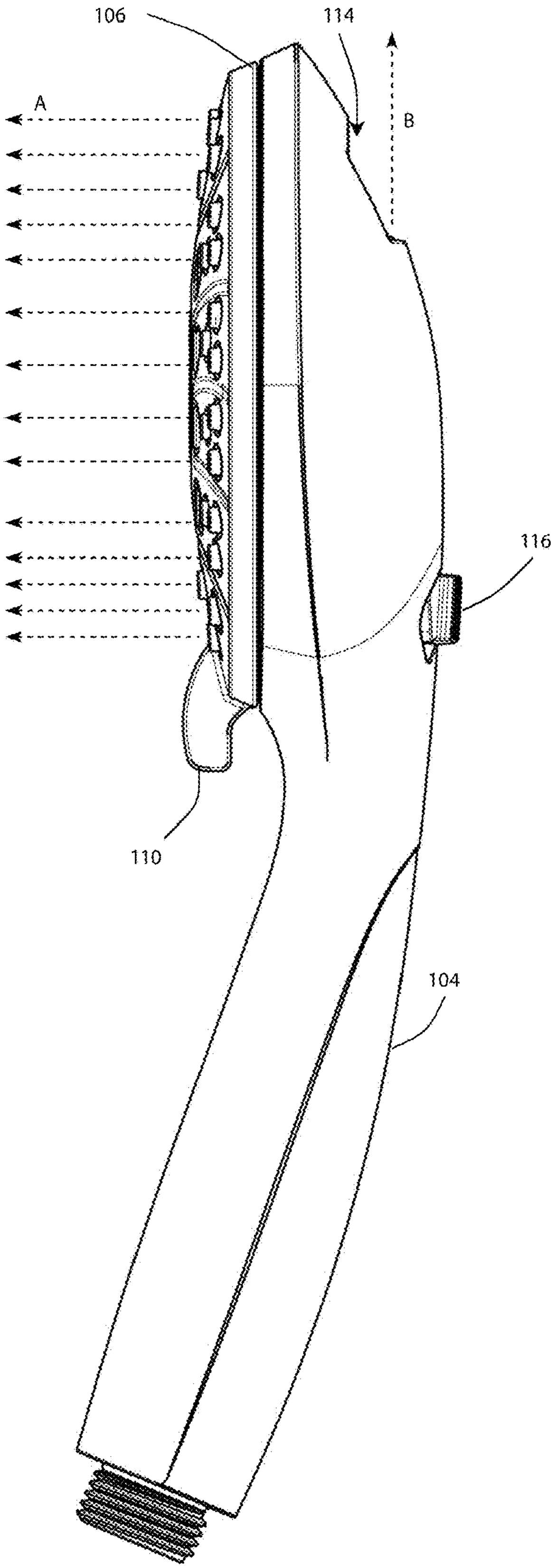
FIG. 1B shows a side view of the exemplary showerhead of FIG. 1A.

FIG. 1A shows a bottom view of an exemplary showerhead 100 according to various exemplary embodiments. FIG. 1B shows a side view of the exemplary showerhead of FIG. 1A. FIG. 10 shows a front view of the exemplary showerhead of FIG. 1A. The showerhead 100 includes a head portion 102 and a handle 104 coupled to the head portion 102 and configured to be held by a user. As shown more clearly in FIG. 1A, the head portion 102 includes a faceplate 106 through which a plurality of nozzles 108 extend.

As illustrated in FIG. 1B. water flows through the nozzles 108 in a first direction (indicated by arrows A) that is generally perpendicular to the faceplate 106. In some embodiments, the plurality of nozzles 108 may include a plurality of groups of nozzles, each of which achieves a desired water pressure and/or coverage area different than the other groups. For example, as illustrated in FIG. 1A, the plurality of nozzles 108 may include a first group of nozzles 108*a*, a second group of nozzles 108*b*, and a third group of nozzles 108*c*. The showerhead 100 additionally includes a lever 110 which is configured to allow a user to rotate the faceplate 106, thus selecting one of the groups of nozzles 108*a-c*. Although FIG. 1A shows a specific arrangement of the nozzles, it should be noted that the nozzles may be arranged in any other manner. The showerhead 100 also includes a water inlet 112 through which water flows into the handle 104 and, subsequently, the showerhead 100.

Figure 1C:
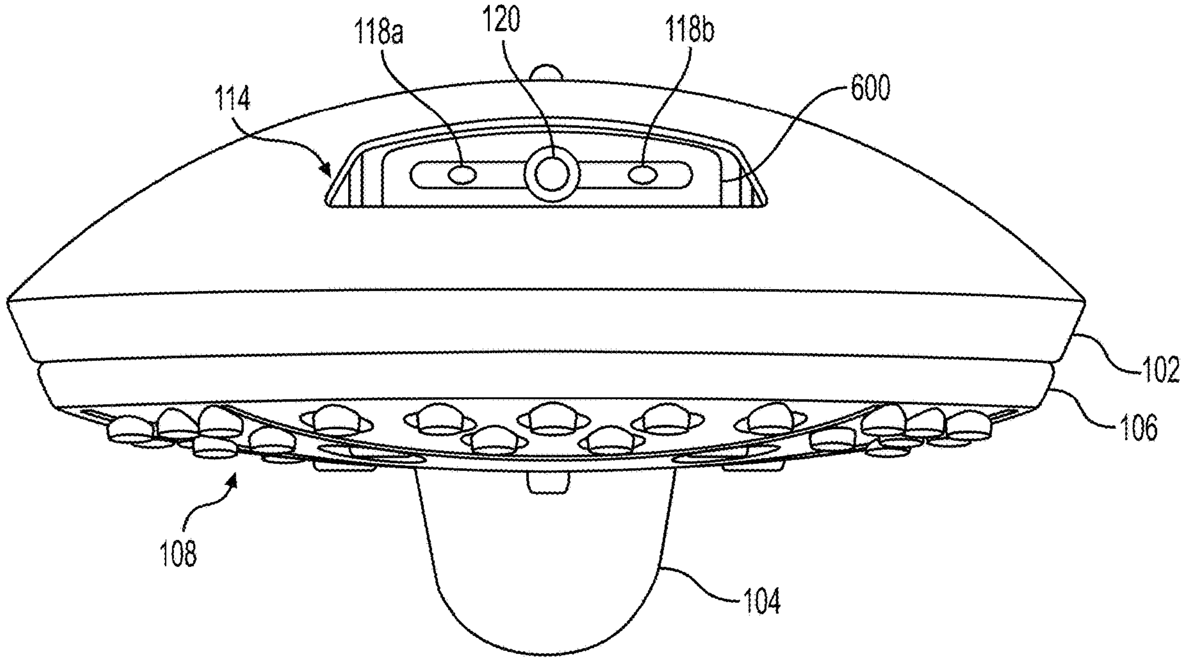
FIG. 1C shows a front view of the exemplary showerhead of FIG. 1A.

As illustrated in FIGS. 1B and 1C, the showerhead 100 further includes a cutout portion 114 formed on a side of the head portion 102 opposite the faceplate 106. As will be described in greater detail below, the cutout portion 114 includes a pair of first nozzles 118*a*, 118*b* and a second nozzle 120 disposed between the pair of first nozzles 118*a*, 118*b*, all of which are configured to direct water flow in a second direction (indicated by arrow B) transverse to the first direction of water flow through the plurality of nozzles 108. In some embodiments, the second direction is perpendicular to the first direction. In some embodiments, the nozzles 118*a*, 118*b*, and 120 may be formed in a nozzle assembly 600 inserted into a corresponding opening in cutout portion 114. It should be noted, however, that the nozzle assembly 600 may alternatively be disposed elsewhere in the head portion 102 as long as the flow indicated by arrow B is transverse to the flow indicated by arrow A. For example, the nozzle assembly 600 may alternatively be disposed at a perimeter of the head portion 102. As will also be described in more detail below, the showerhead 100 further includes a flow selector 116 configured to be moved between a first position, a second position, and a third position to selectively direct flow through one of (a) the nozzles 108, (b) the pair of first nozzles 118*a* and 118*b*, or (c) the second nozzle 120. The flow selector 116 is configured to maintain its position in one of the three positions without an external force (e.g., a user's hand holding the flow selector 116 in place).

Figure 2A:
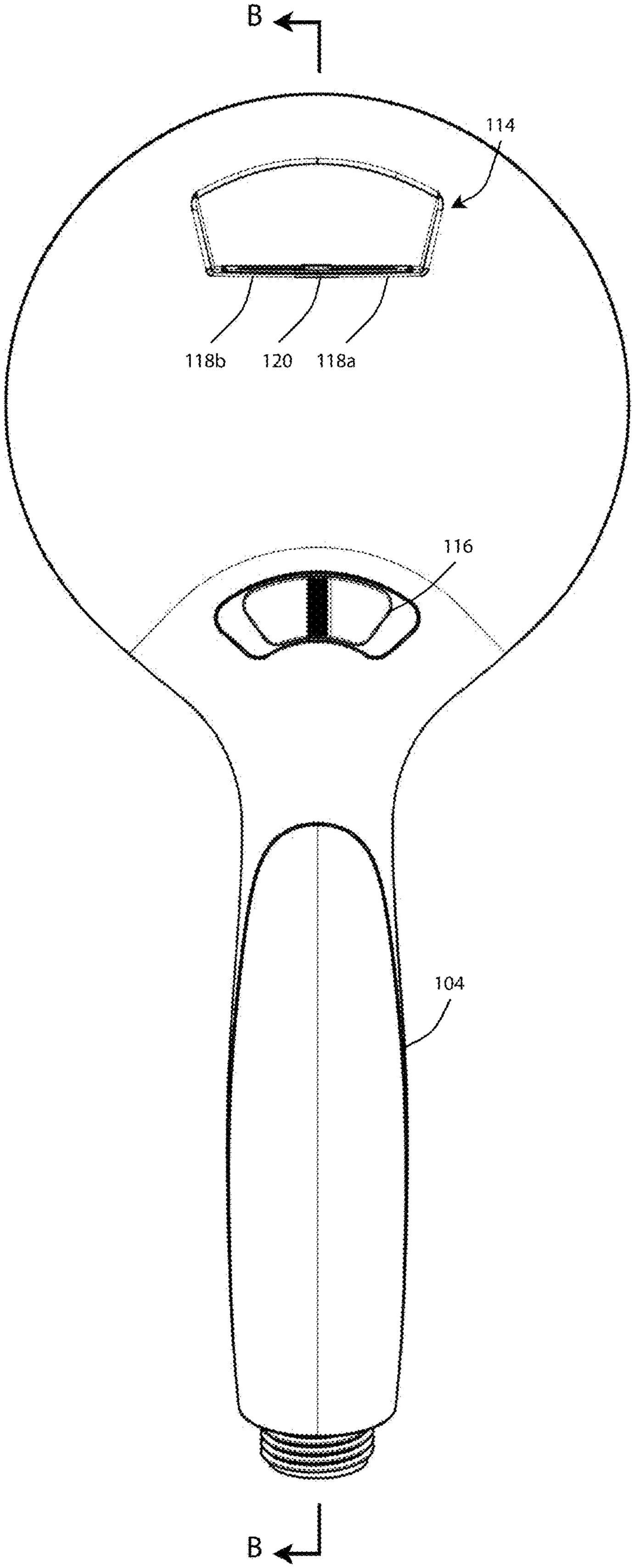
FIG. 2A is a top view of the exemplary showerhead of FIG. 1A with a flow selector in a first position.
Figure 2B:
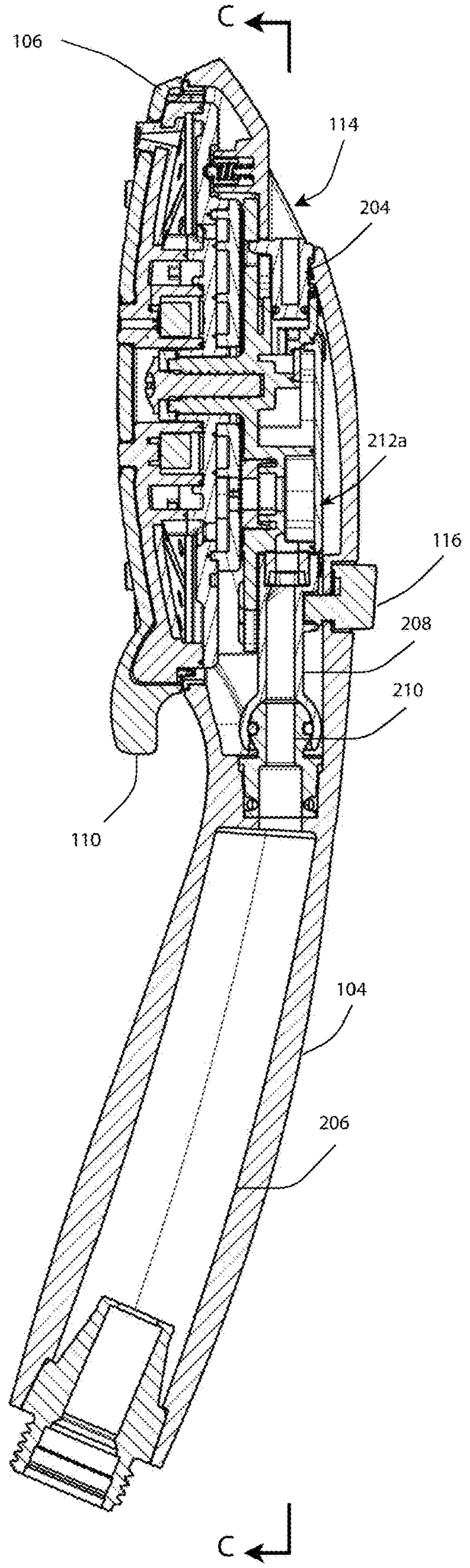
FIG. 2B is a cross-sectional view of the exemplary showerhead of FIG. 2A taken along line B-B.
Figure 2C:
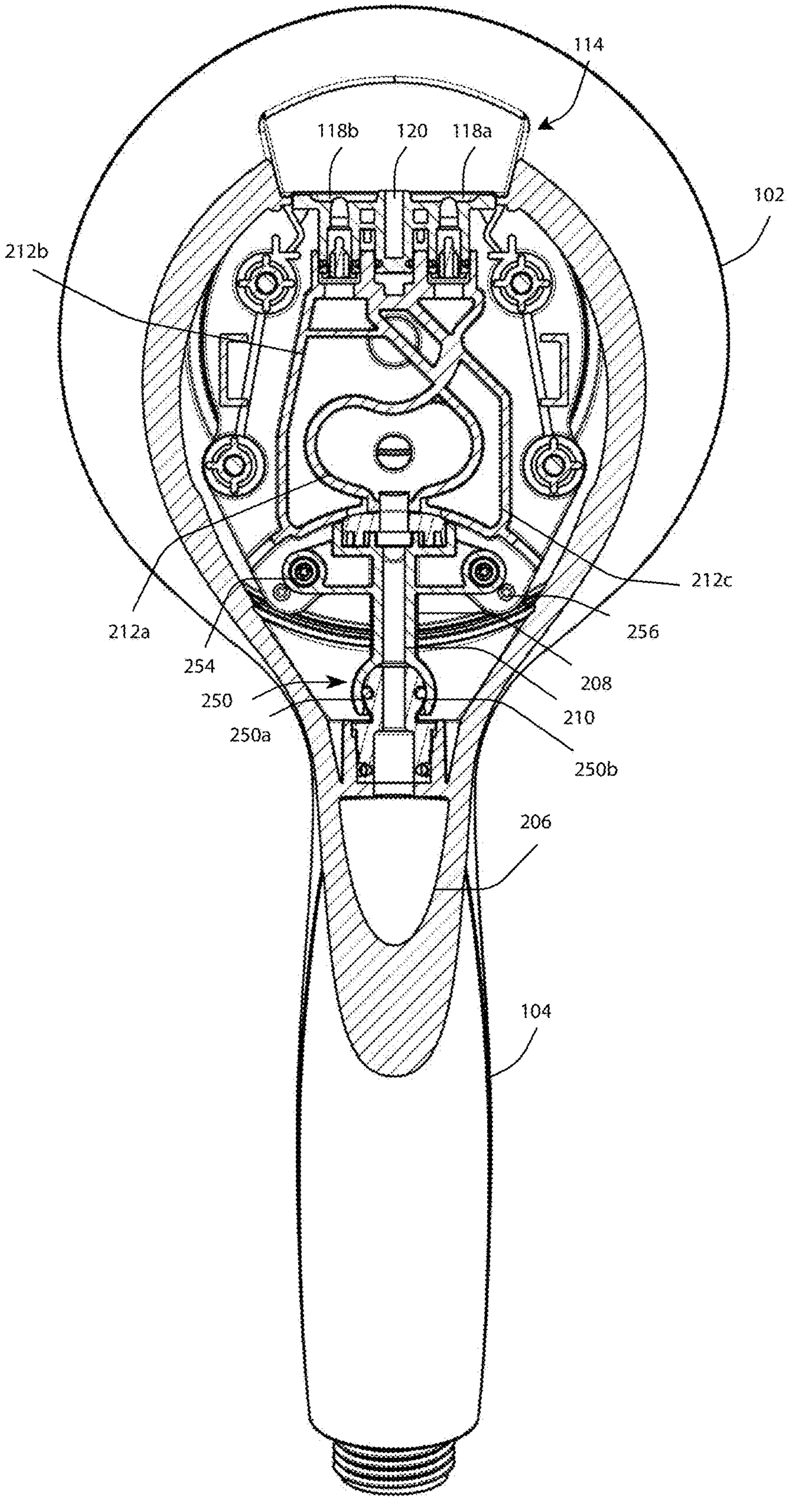
FIG. 2C is a cross-sectional view of the exemplary showerhead of FIG. 2B taken along line C-C.

The following description will be made with respect to FIGS. 2A-2C. FIG. 2A is a top view of the exemplary showerhead 100 of FIG. 1A with the flow selector 116 in a first position. FIG. 2B is a cross-sectional view of the exemplary showerhead 100 of FIG. 2A taken along line B-B. FIG. 2C is a cross-sectional view of the exemplary showerhead 100 of FIG. 2B taken along line C-C. When the flow selector 116 is in the first position, water flow is directed through the plurality of nozzles 108 (e.g., for showering).

As shown in FIG. 2B, the flow selector 116 is coupled to a flow director 208, which includes a second channel 210 therein. The second channel 210 is fluidly coupled to a first channel 206 disposed through the handle 104 such that water flows into the first channel 206, through the second channel 210, and into a desired plenum, as will be discussed below. The flow selector 116 is configured to allow the user to move the flow director 208 such that water is directed through one of the plurality nozzles 108, the pair of first nozzles 118*a*, 118*b*, or the second nozzle 120. It should be noted that although the flow selector 116 is depicted as a moveable switch extending through a slot, any type of selection device that enables the user to selectively direct the flow of water to the desired nozzle(s). That is, although the following description is made with respect to a specific flow selector 116 and flow director 208, it should be noted that this description is illustrative and that various types of flow selectors and flow directors may be used to allow the user to selectively direct water flow to a desired nozzle(s). FIGS. 2A-2C depict the flow selector in a first position in which water is directed through the second channel 210 and into a first plenum 212*a* fluidly coupled to the plurality of nozzles 108 disposed through the faceplate 106. This is shown more clearly in FIG. 2C.

Also shown in FIG. 2C are a second plenum 212*b* and a third plenum 212*c* which will be discussed below. In some embodiments, the flow director 208 includes a ball-and-socket coupling 250 having a socket 250*a* configured to pivot the flow director 208 about an axis of a head 250*b*. In some embodiments, to retain the flow director 208 in the desired position, one or more spring loaded pins 254 (two shown) are disposed in the flow director 208 to engage a corresponding one or more of a plurality of indentations 256 formed in the showerhead 100. The indentations 256 are arranged such that the flow director 208 can snap into one of the three positions. In some embodiments, the plurality of receptacles are connected via a plurality of grooves 257 (shown clearly in FIGS. 3B, 4B, and 5A) such that the one or more spring-loaded pins 254 are guided to the indentations 256 via the grooves 257 when the flow director 208 moves between the first, second, and third positions.

Figure 3A:
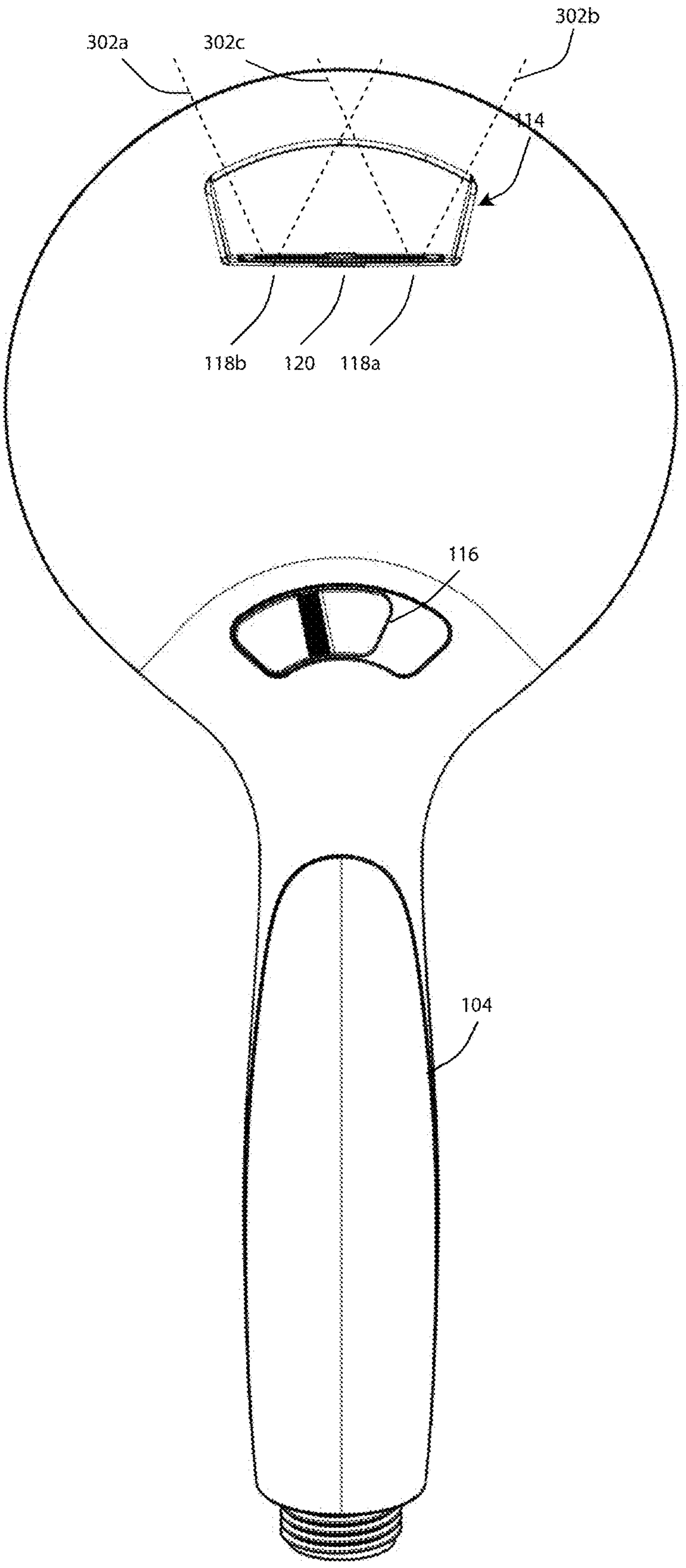
FIG. 3A is a top view of the exemplary showerhead of FIG. 1A with a flow selector in a second position.
Figure 3B:
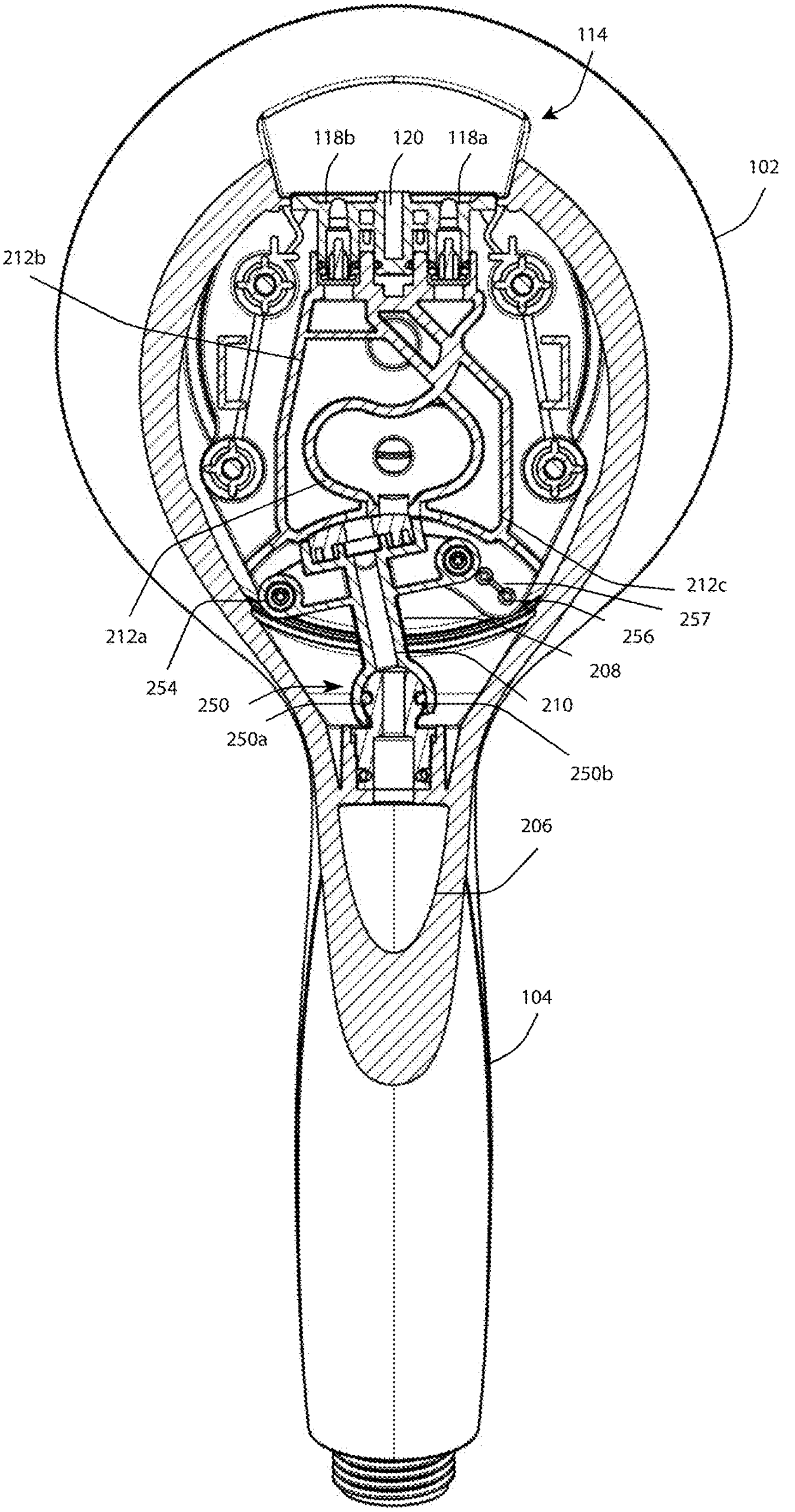
FIG. 3B is a partial cross-sectional view of the exemplary showerhead of FIG. 3A.

FIG. 3A is a top view of the exemplary showerhead 100 of FIG. 1A with the flow selector 116 in a second position. FIG. 3B is a partial cross-sectional view of the exemplary showerhead of FIG. 3A. As illustrated in FIGS. In 3A and 3B, when the flow selector 116 and the flow director 208 are in the second position, the second channel 210 is fluidly coupled to the second plenum 212*b*, which is fluidly coupled to the pair of first nozzles 118*a*, 118*b*. As a result, water flow is prevented from flowing to the plurality of nozzles 108 and instead flows through the first channel 206, the second channel 210, the second plenum 212*b*, and out of the pair of first nozzles 118*a*, 118*b*. In some embodiments, each of the pair of first nozzles 118*a*, 118*b* is configured to form a fan-shaped spray 302*a* and 302*b*, respectively, to cover a large surface area. As illustrated in FIG. 3A, the two fan-shaped sprays 302*a*, 302*b* overlap to form a combined fan-shaped spray 302*c*. Although only the beginning of the overlap is illustrated in FIG. 3A, it should be noted that a size of the combined fan-shaped spray 302*c* will increase as the distance from the showerhead 100 increases. Although a pair of first nozzles are shown, it should be noted that a singular first nozzle configured to form a singular fan-shaped spray may alternatively be utilized.

Figure 4A:
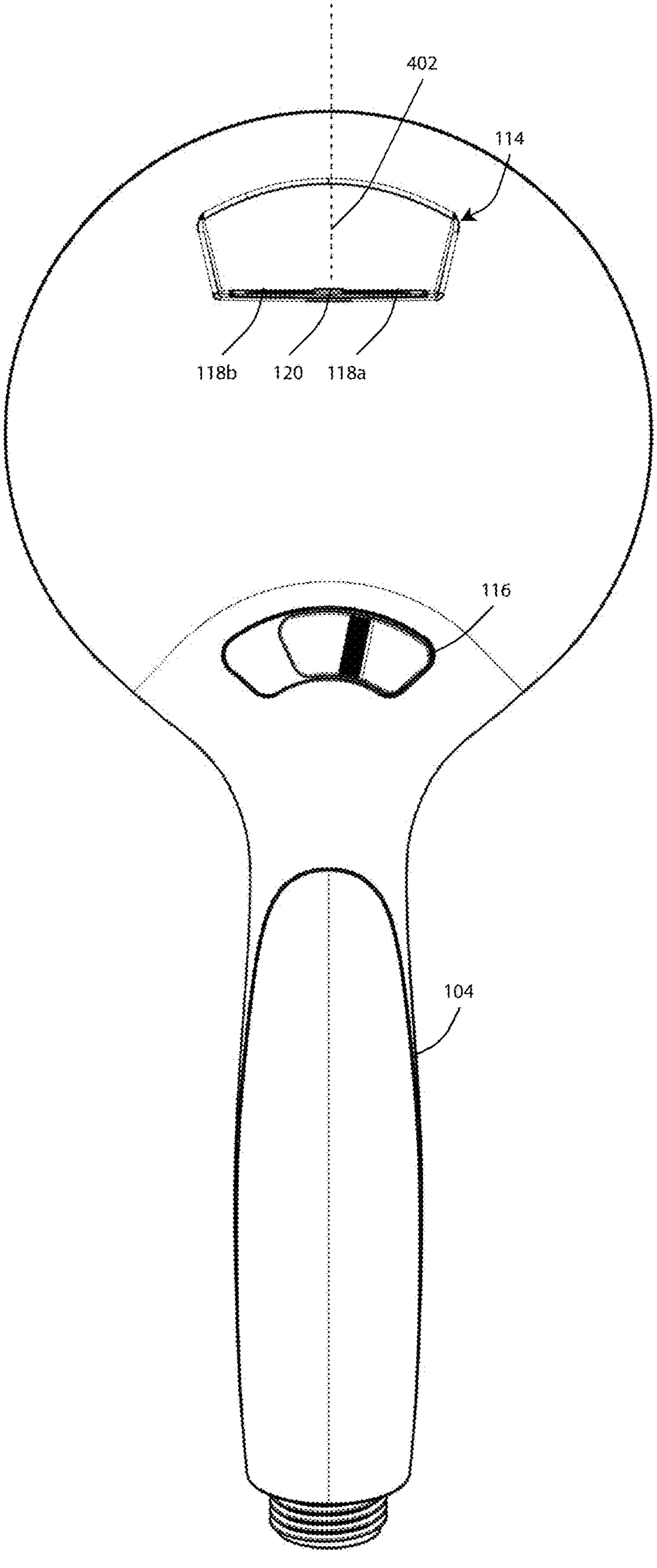
FIG. 4A is a top view of the exemplary showerhead of FIG. 1A with a flow selector in a third position.
Figure 4B:
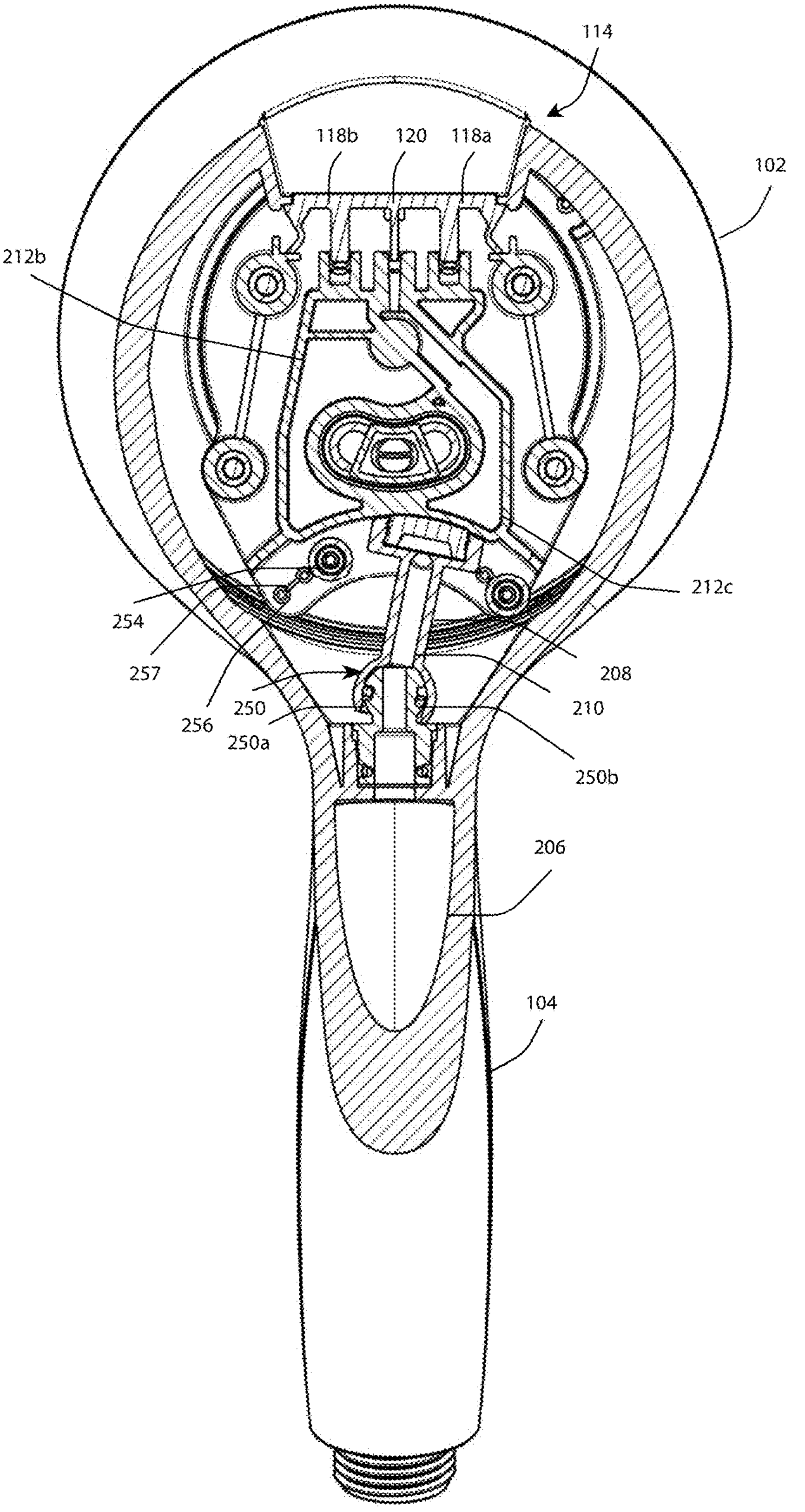
FIG. 4B is a partial cross-sectional view of the exemplary showerhead of FIG. 4A.

FIG. 4A is a top view of the exemplary showerhead of FIG. 1A with the flow selector 116 in a third position. FIG. 4B is a partial cross-sectional view of the exemplary showerhead of FIG. 4A. As illustrated in FIGS. 4A and 4B, when the flow selector 116 and the flow director 208 are in the third position, the second channel 210 is fluidly coupled to the third plenum 212*c*, which is fluidly coupled to the second nozzle 120. As a result, water flow is prevented from flowing to the plurality of nozzles 108 (and the pair of first nozzles 118*a*, 118*b*) and instead flows through the first channel 206, the second channel 210, the third plenum 212*c*, and out of the second nozzle 120. In some embodiments, the second nozzle 120 is configured to create a jet stream 402 such that a user can either hold the showerhead 100 closer to a surface to achieve a greater force of impact of the jet stream 402 on the surface or further away from the surface so that the user can keep a desired distance from the surface (e.g., to avoid any splashing back onto the user). The jet stream 402 is configured to provide a focused stream at desired point.

Figure 5A:
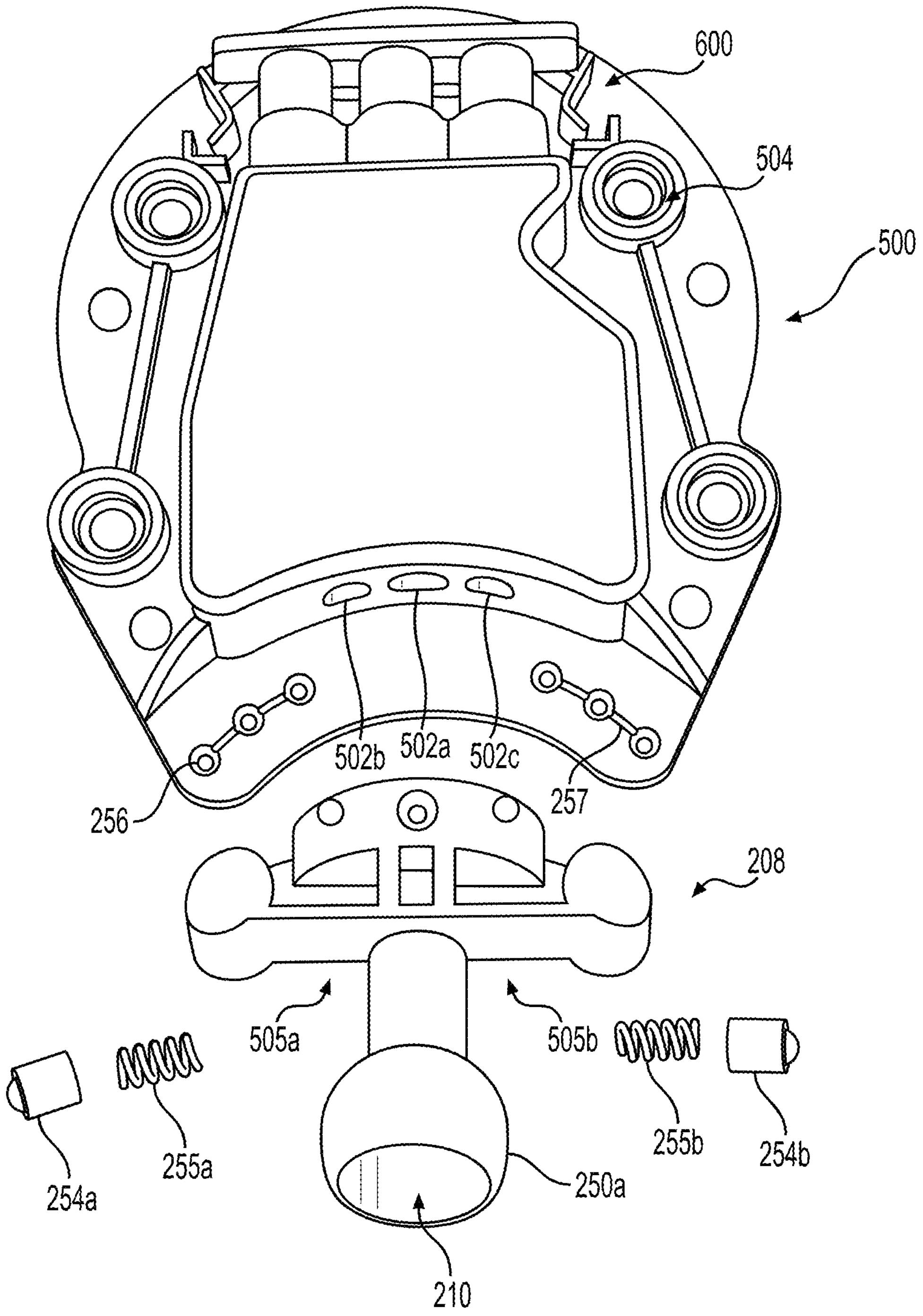
FIG. 5A is a top view of a flow distribution chamber and flow director of a showerhead according to various exemplary embodiments.
Figure 5B:
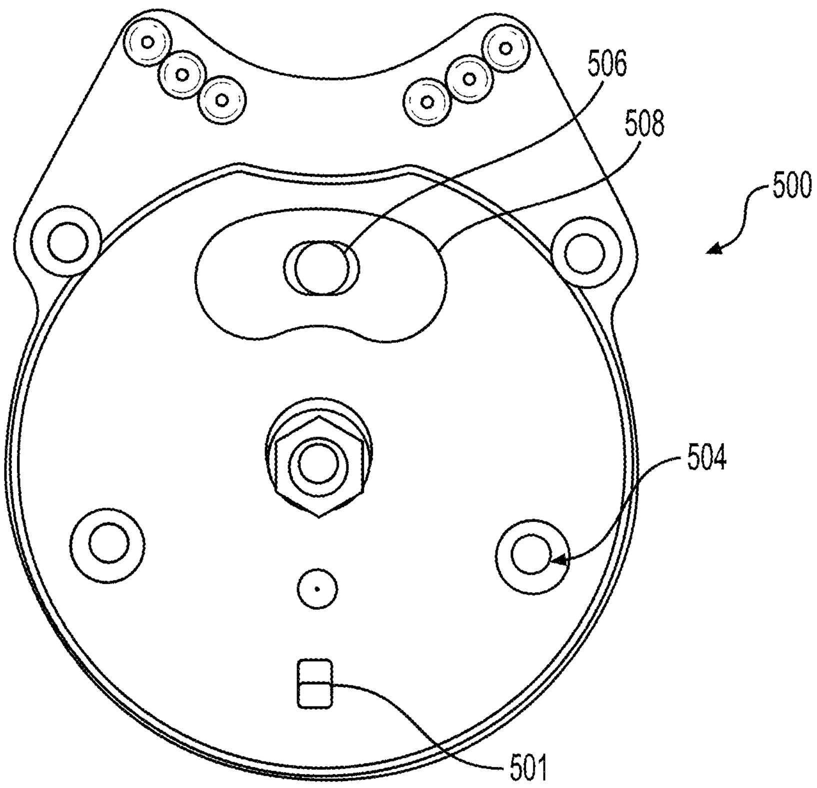
FIG. 5B is a bottom view of the exemplary flow distribution chamber of FIG. 5A.
Figure 5C:
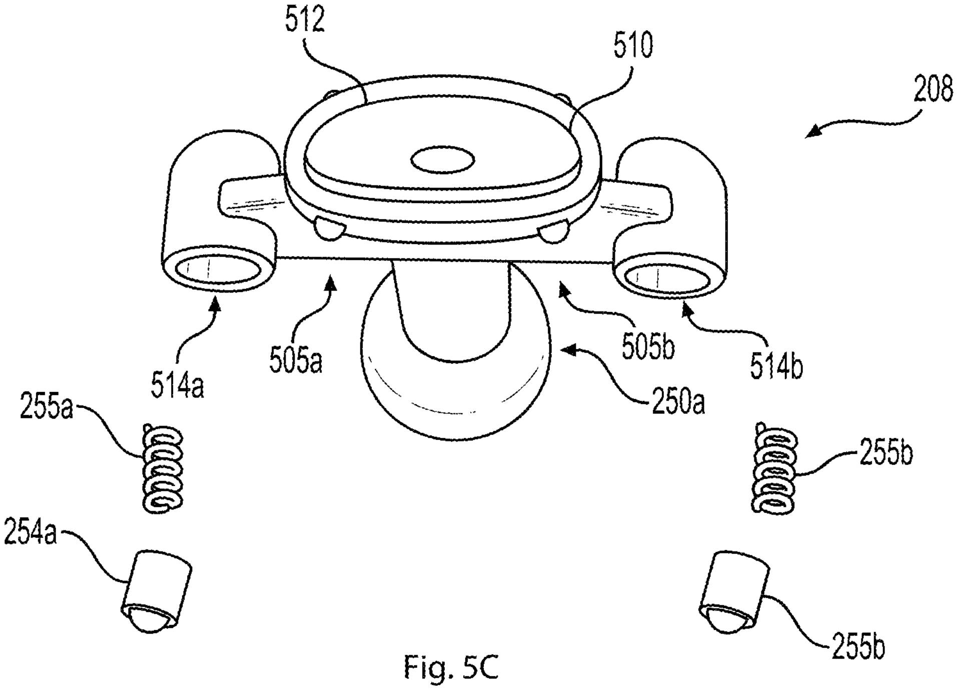
FIG. 5C is a front view of the flow director of FIG. 5A.

FIG. 5A is a top view of a flow distribution chamber 500 and the flow director 208 of a showerhead according to various exemplary embodiments. FIG. 5B is a bottom view of the flow distribution chamber 500 of FIG. 5A. FIG. 5C is a front view of the flow director 208 of FIG. 5A. In some embodiments, the flow distribution chamber 500 includes the first, second, and third plenums 212*a*, 212*b*, 212*c* discussed above and is disposed within the head portion 102. As illustrated in FIG. 5A, the flow distribution chamber 500 includes a first inlet 502*a*, a second inlet 502*b*, and a third inlet 502*c*. The first, second, and third inlets 502*a*-502*c* are fluidly coupled to the first, second, and third plenums 212*a*-212*c*, respectively. In some embodiments, the flow distribution chamber 500 may include a plurality of fixation openings 504 to allow for the insertion of fixation elements (not shown) to couple the flow distribution chamber 500 to the showerhead. As illustrated in FIG. 5B, the flow distribution chamber 500 includes an outlet 506 on a bottom side to allow a flow of water to be directed to the plurality of nozzles 108 when the flow selector/director 106/208 is in the first position. In some embodiments, a sealing element 508 may be disposed around the outlet 506 to prevent water from leaking out of flow distribution chamber 500 when water flows through the first plenum 212*a*. In some embodiments, a nozzle assembly 600 may be coupled to the flow distribution chamber 500. As will be described in more detail below with respect to FIGS. 6A and 6B, the nozzle assembly 600 includes the pair of first nozzles 118*a*, 118*b* and the second nozzle 120. In such an embodiment, the flow distribution chamber may include a slot 501 configured to receive a corresponding protrusion 601 (shown in FIGS. 6A and 6B) of the nozzle assembly 600 to ensure proper alignment of the nozzle assembly 600 with respect to the flow distribution chamber 500. It should be noted, however, that in some embodiments, the pair of first nozzles 118*a*, 118*b* and the second nozzle 120 may alternatively be integrally formed as part of the flow distribution chamber.

Returning to FIG. 5A, in some embodiments, the flow director 208 includes a first arm 505*a* and a second arm 505*b* extending in opposite directions. As shown more clearly in FIG. 5C, the first arm 505*a* includes a first receptacle 514*a* configured to house a first one of the spring-loaded pins, which includes a first spring 255*a* and a first pin 254*a* that sits atop the first spring 255*a*, and the second arm 505*b* includes a second receptacle 514*b* configured to house a second one of the spring-loaded pins, which includes a second spring 255*b* and a second pin 254*b* that sits atop the second spring 255*b*. The first and second springs 255*a*, 255*b* are configured to bias the first and second pins 254*a*, 254*b* into corresponding ones of the plurality of indentations 256 based on the position of the flow director 208. As illustrated in FIG. 5C, the flow director 208 includes an outlet 512 that fluidly coupled the second channel 210 to one of the first, second, or third inlets 502*a*-502*c*. In some embodiments, the outlet 512 may be oval shaped so that if the outlet 512 is partially blocked by a portion of the flow distribution chamber 500, a resulting reduction in the flow rate of water with from a partially blocked circular outlet is avoided. In some embodiments, an elongated sealing element 510 is disposed around the outlet 512 to ensure that water flows through the outlet 512 and only into the intended inlet (502*a*, 502*b*, or 502*c*). In some embodiments, the sealing element 510 is formed of a rubber material and is oval shaped to provide an improved seal.

Figure 6A:
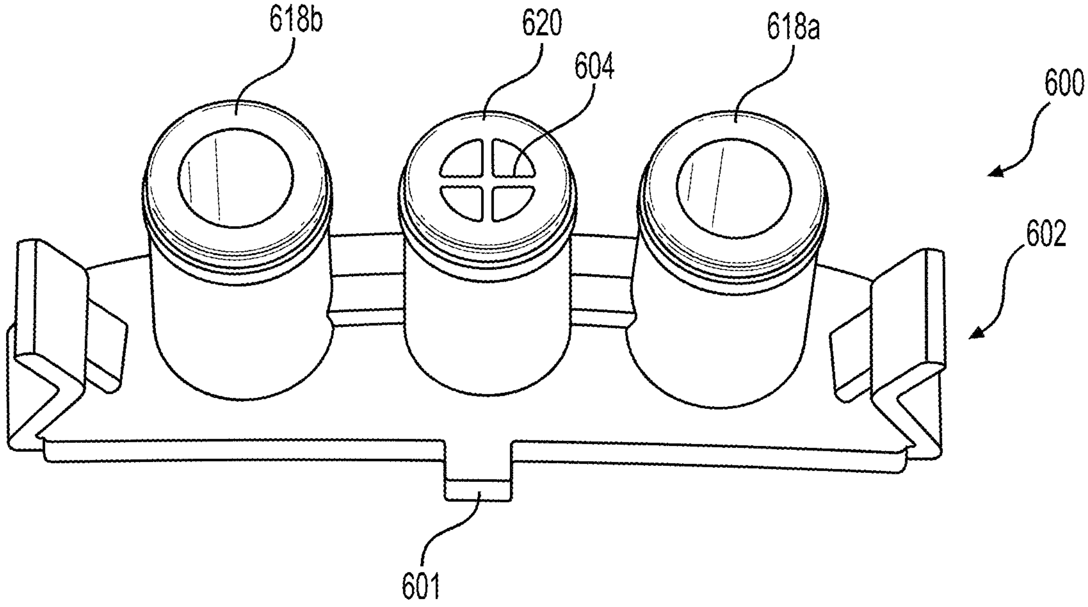
FIG. 6A is a rear view of a nozzle assembly for use with a showerhead according to various exemplary embodiments.
Figure 6B:
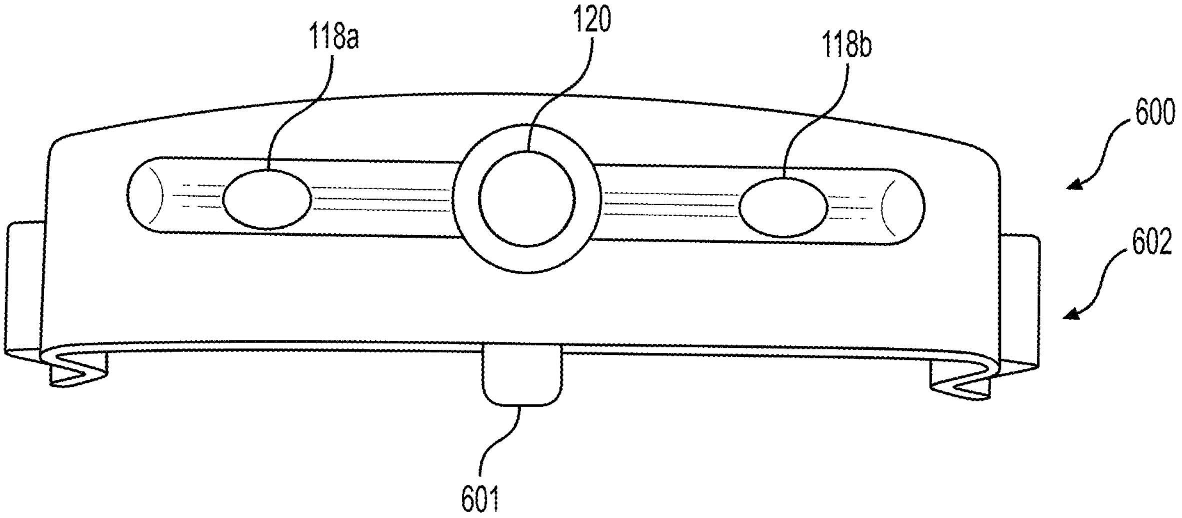
FIG. 6B is a front view of a nozzle assembly for use with a showerhead according to various exemplary embodiments.

FIG. 6A is a rear view of a nozzle assembly 600 for use with a showerhead according to various exemplary embodiments. FIG. 6B is a front view of the nozzle assembly 600. In some embodiments, the nozzle assembly 600 includes a pair of clips 602 configured to maintain a coupling of the nozzle assembly 600 to the flow distribution chamber 500. The nozzle assembly 600 includes a pair of first inlets 618*a* and 618*b* corresponding to the pair of first nozzles 118*a*, 118*b* and a second inlet 620 corresponding to the second nozzle 120. In some embodiments, the second inlet 620 includes a cross-shaped wall configured to ensure the jet spray 402 exiting the second nozzle 120 is straight and narrow. As shown in FIG. 6B, in some embodiments, each of the pair of first nozzles 118*a*, 118*b* may be oval-shaped to ensure a fan-shaped spray pattern is formed.

Figure 7:
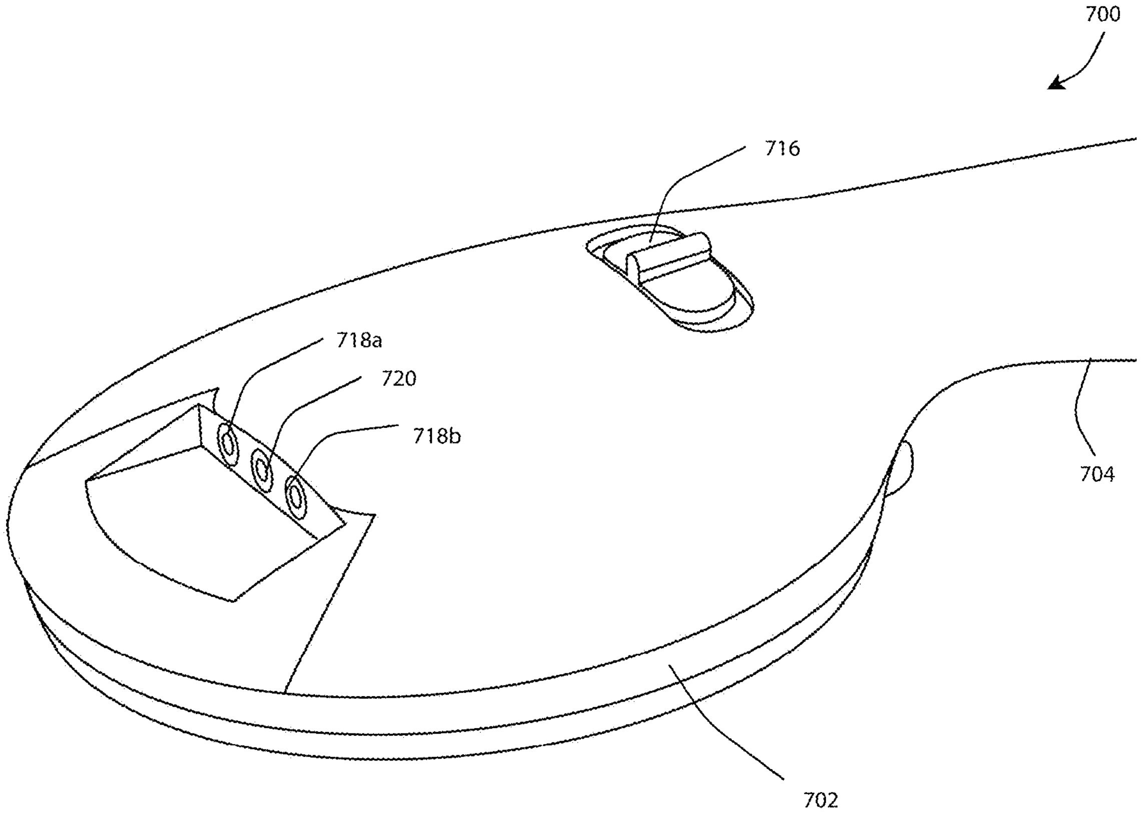
FIG. 7 shows a perspective view of an exemplary showerhead according to various exemplary embodiments.

FIG. 7 shows a perspective view of an exemplary showerhead according to various exemplary embodiments. As illustrated in FIG. 7, the showerhead 700 includes substantially similar features as those described above with respect to showerhead 100, may include a head portion 702, a handle portion 704 extending from the head portion, a flow selector 716, one or more first nozzles (two shown in FIG.

7, 718*a*, 718*b*), and at least one second nozzle 720 (one shown in FIG. 7). As such, a description of many of these elements and features is omitted here for clarity. However, it should be noted that these elements and features are included in the showerhead 700 and function substantially similarly to those described above and that the following description will focus primarily on the different aspects of the showerhead 700.

In some embodiments, the showerhead 700 may be configured such that the flow selector 716 is moveable between two positions: a first position in which water flow is directed through a plurality of nozzles similar to the plurality of nozzles 108 described above (not shown in FIG. 7), and a second position in which water flow is directed through the one or more first nozzles 718*a,b* and the at least one second nozzle 720. In such an embodiment, two plenums (similar to the plenums discussed above) exist, a first plenum fluidly coupled to the plurality of nozzles (e.g., showering nozzles) and a second plenum fluidly coupled to the one or more first nozzles 718*a,b* and the at least one second nozzle 720. The flow selector is configured to remain in the first or second positions without an external force acting on it (e.g., a user's hand holding the flow selector 716 in one of the two positions).

Although a specific arrangement of the first and second nozzles (718*a*, 718*b*, 720) is illustrated, it should be noted that these nozzles may be arranged in any alternative manner and may include one or more of each type of nozzle as long as the direction of water flow through the first and second nozzles (718*a*, 718*b*, 720) is transverse the direction of water flow through the plurality of nozzles on the faceplate of the showerhead. In some embodiments, all of the nozzles 718*a*, 718*b*, and 720 may be configured to create corresponding jet streams of water spray. In some embodiments, all of the nozzles 718*a*, 718*b*, and 720 may be alternatively be configured to create fan-shaped sprays. In some embodiments, the nozzles 718*a*, 718*b*, and 720 may include any combination of nozzles to create a combination of jet streams and fan-shaped sprays. In some embodiments, these nozzles may only include two nozzles 718*a* or 718*b* in addition to 720.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A showerhead, comprising:

a head portion;

a handle extending from the head portion, the handle having an inlet disposed at an end of the handle opposite the head portion and a first channel extending through the handle;

a faceplate disposed at a first side of the head portion;

a plurality of first nozzles extending through the faceplate;

a second nozzle disposed in the head portion separate from the faceplate;

a third nozzle disposed in the head portion separate from the faceplate adjacent to the second nozzle;

a first plenum disposed within the head portion and fluidly coupled to the first nozzles;

a second plenum disposed within the head portion and fluidly coupled to the second nozzle;

a third plenum disposed within the head portion and fluidly coupled to the third nozzle; and a flow director having a second channel fluidly coupled to the first channel and moveable between a first position in which the second channel fluidly couples the first channel to the first plenum, a second position in which the second channel fluidly couples the first channel to the second plenum, and a third position in which the second channel fluidly couples the first channel to the third plenum to selectively direct a flow of water through a corresponding one of the first nozzles, the second nozzle, or the third nozzle, wherein the first nozzles are configured to direct the flow of water in a first direction, the second nozzle is configured to direct the flow of water in a second direction, and the third nozzle is configured to direct the flow of water in a third direction, the second direction being parallel to the third direction, and both the second and third directions being transverse to the first direction.

2. The showerhead of claim 1, wherein the second and third directions are perpendicular to the first direction.

3. The showerhead of claim 1, wherein the third nozzle is configured to create a jet stream of water.

4. The showerhead of claim 1, further comprising:

a first flow selector coupled to the flow director and configured to allow a user to move the flow director to a desired one of the first position, the second position, and the third position.

5. The showerhead of claim 4, further comprising:

a second flow selector coupled to the faceplate and configured to allow the user to rotate the faceplate to direct the flow of water through one of a first portion of the first nozzles, a second portion of the first nozzles and a third portion of first nozzles when the flow director is in the first portion.

6. The showerhead of claim 1, wherein the flow director includes a ball-and-socket coupling to allow the flow director to pivot about an axis of a head of the ball-and-socket coupling.

7. The showerhead of claim 1, wherein the flow director includes one or more spring-loaded pins configured to snap into a corresponding one or more receptacles formed in the head portion to retain the flow director in one of the first position, the second position, and the third position.

8. The showerhead of claim 1, wherein the second nozzle is disposed on a second side of the head portion opposite the first side.

9. A showerhead, comprising:

a head portion;

a handle extending from the head portion, the handle having an inlet disposed at an end of the handle opposite the head portion and a first channel extending through the handle;

a faceplate disposed at a first side of the head portion;

a plurality of first nozzles extending through the faceplate;

a second nozzle disposed in the head portion separate from the faceplate;

a third nozzle disposed in the head portion separate from the faceplate adjacent to the second nozzle;

a first plenum disposed within the head portion and fluidly coupled to the first nozzles;

a second plenum disposed within the head portion and fluidly coupled to the second nozzle;

a third plenum disposed within the head portion and fluidly coupled to the third nozzle; and a flow director having a second channel fluidly coupled to the first channel and moveable between a first position in which the second channel fluidly couples the first channel to the first plenum, a second position in which the second channel fluidly couples the first channel to the second plenum, and a third position in which the second channel fluidly couples the first channel to the third plenum to selectively direct a flow of water through a corresponding one of the first nozzles, the second nozzle, or the third nozzle, wherein the first nozzles are configured to direct the flow of water in a first direction through a first plane, the second nozzle and the third nozzle are configured to direct the flow of water in a second direction through a second plane, the second plane being transverse to the first plane.

10. The showerhead of claim 9, further comprising a further second nozzle, wherein each of the further second nozzle and the second nozzle is configured to direct the flow of water in the second direction as a fan-shaped spray and the third nozzle is configured to direct the flow of water in the second direction as a jet stream of water.

11. The showerhead of claim 10, wherein the further second and the second nozzle are configured such that the fan-shaped spray of a first one of the second nozzles overlaps with the fan-shaped spray of a second one of the second nozzles to form a combined fan-shaped spray.

12. The showerhead of claim 10, wherein the third nozzle is disposed between the second nozzles.

13. The showerhead of claim 10, wherein an opening of each of the further second nozzle and the second nozzle is in the same plane as an opening of the third nozzle and a longitudinal axis of each of the further second nozzle and the second nozzle is substantially parallel to a longitudinal axis of the third nozzle.

14. A showerhead, comprising:

a head portion;

a handle extending from the head portion, the handle having an inlet disposed at an end of the handle opposite the head portion and a first channel extending through the handle;

a faceplate disposed at a first side of the head portion;

a plurality of first nozzles extending through the faceplate;

a second nozzle disposed in the head portion separate from the faceplate;

a third nozzle disposed in the head portion separate from the faceplate adjacent to the second nozzle;

a first plenum disposed within the head portion and fluidly coupled to the first nozzles;

a second plenum disposed within the head portion and fluidly coupled to the second nozzle;

a third plenum disposed within the head portion and fluidly coupled to the third nozzle; and a flow director having a second channel fluidly coupled to the first channel and moveable between a first position in which the second channel fluidly couples the first channel to the first plenum, a second position in which the second channel fluidly couples the first channel to the second plenum, and a third position in which the second channel fluidly couples the first channel to the third plenum to selectively direct a flow of water through a corresponding one of the first nozzles, the second nozzle, or the third nozzle, wherein the first nozzles are configured to direct the flow of water in a first direction, the second nozzle is configured to direct the flow of water in a second direction, and the third nozzle is configured to direct the flow of water in a third direction, the second direction being parallel to the third direction, and both the second and third directions being transverse to the first direction, and wherein the second and third nozzles extend from a cutout portion formed on a second side of the head portion opposite of the faceplate.

15. The showerhead of claim 14, wherein the second and third nozzles are formed in a nozzle assembly sized and shaped to be inserted into a correspondingly sized opening in the cutout portion.

* * * * *